(12) United States Patent
Knighton

(10) Patent No.: US 8,905,742 B2
(45) Date of Patent: Dec. 9, 2014

(54) COMPACT ROTARY PLATEN 3D PRINTER

(75) Inventor: Mark S. Knighton, Santa Monica, CA (US)

(73) Assignee: Synerdyne Corporation, Santa Monica, CA (US)

( * ) Notice: Subject to any disclaimer, the term of this patent is extended or adjusted under 35 U.S.C. 154(b) by 395 days.

(21) Appl. No.: 12/884,982

(22) Filed: Sep. 17, 2010

(65) Prior Publication Data

US 2012/0072001 A1 Mar. 22, 2012

(51) Int. Cl.
*B29C 47/06* (2006.01)
*G06F 17/00* (2006.01)
*B29C 47/08* (2006.01)
*B29C 67/00* (2006.01)
*B29C 47/00* (2006.01)

(52) U.S. Cl.
CPC ......... *B29C 47/0866* (2013.01); *B29C 67/0055* (2013.01); *B29C 67/0088* (2013.01); *B29C 47/0009* (2013.01)
USPC ........... 425/162; 264/308; 264/310; 264/317; 425/174.4; 425/150; 425/173

(58) Field of Classification Search
USPC ......... 264/308, 401, 40.7, 317, 310; 425/375, 425/140, 150, 173, 470; 700/98, 118, 204
See application file for complete search history.

(56) References Cited

U.S. PATENT DOCUMENTS

| | | |
|---|---|---|
| 3,013,925 A | 12/1961 | Larsen |
| 4,589,830 A | 5/1986 | Clawson |
| 4,752,352 A | 6/1988 | Feygin |
| 5,260,009 A | 11/1993 | Penn |
| 5,303,141 A | 4/1994 | Batchelder et al. |
| 5,398,193 A | 3/1995 | deAngelis |
| 5,402,351 A | 3/1995 | Batchelder et al. |
| 5,514,232 A | 5/1996 | Burns |
| 5,683,561 A | 11/1997 | Hollars et al. |
| 5,694,324 A | 12/1997 | Masters et al. |
| 5,730,925 A * | 3/1998 | Mattes et al. .................. 264/497 |
| 5,740,051 A | 4/1998 | Sanders et al. |
| 5,879,489 A | 3/1999 | Burns et al. |
| 5,993,554 A | 11/1999 | Keicher et al. |
| 6,309,581 B1 | 10/2001 | Gervasi |

(Continued)

FOREIGN PATENT DOCUMENTS

EP 1262305 6/2006
JP 2001-270096 10/2001

OTHER PUBLICATIONS

Synerdyne Corporation, et al., PCT Search Report mailed Feb. 8, 2012; PCT/US2011/035260.

(Continued)

*Primary Examiner* — Joseph S Del Sole
*Assistant Examiner* — Nahida Sultana
(74) *Attorney, Agent, or Firm* — Blakely Sokoloff Taylor & Zafman LLP

(57) ABSTRACT

A three-dimensional printer to fabricate three dimensional objects using a rotary build surface platen. This architecture achieves high space efficiency, and rigidity for precision. The apparatus size can be very small relative to the objects it can build. The 3D printer can also actively shape the side profile of a layer for greater fidelity with the ideal input geometry. The profile can be shaped through subtraction of material, or by constraining the material while it is deposited.

7 Claims, 13 Drawing Sheets

(56) References Cited

U.S. PATENT DOCUMENTS

| | | | |
|---|---|---|---|
| 6,391,251 B1 | 5/2002 | Keicher et al. | |
| 6,405,095 B1 | 6/2002 | Jang et al. | |
| 6,575,218 B1 | 6/2003 | Burns et al. | |
| 6,627,835 B1 | 9/2003 | Chung et al. | |
| 6,629,011 B1 | 9/2003 | Calderon et al. | |
| 6,764,636 B1* | 7/2004 | Allanic et al. | 264/401 |
| 6,841,116 B2* | 1/2005 | Schmidt | 264/401 |
| 6,896,839 B2* | 5/2005 | Kubo et al. | 264/460 |
| 7,004,222 B2* | 2/2006 | Ederer et al. | 164/155.1 |
| 7,033,160 B2 | 4/2006 | Fong | |
| 7,037,382 B2 | 5/2006 | Davidson | |
| 7,125,512 B2 | 10/2006 | Crump et al. | |
| 7,168,935 B1* | 1/2007 | Taminger et al. | 425/174.4 |
| 7,291,002 B2* | 11/2007 | Russell et al. | 425/447 |
| 7,300,619 B2 | 11/2007 | Napadensky et al. | |
| 7,597,835 B2* | 10/2009 | Marsac | 264/310 |
| 7,879,393 B2* | 2/2011 | Ederer et al. | 427/203 |
| 8,246,888 B2* | 8/2012 | Hopkins et al. | 264/308 |
| 2001/0017085 A1 | 8/2001 | Kubo et al. | |
| 2001/0019340 A1 | 9/2001 | Kubo et al. | |
| 2001/0050448 A1* | 12/2001 | Kubo et al. | 264/308 |
| 2002/0029094 A1 | 3/2002 | Koreishi | |
| 2002/0145213 A1 | 10/2002 | Liu et al. | |
| 2003/0090034 A1* | 5/2003 | Mulhaupt et al. | 264/255 |
| 2004/0170765 A1* | 9/2004 | Ederer et al. | 427/355 |
| 2004/0175451 A1 | 9/2004 | Maekawa et al. | |
| 2005/0001356 A1* | 1/2005 | Tochimoto et al. | 264/308 |
| 2005/0167038 A1 | 8/2005 | Torris et al. | |
| 2006/0105102 A1* | 5/2006 | Hochsmann et al. | 427/180 |
| 2006/0225834 A1 | 10/2006 | Medina et al. | |
| 2007/0077323 A1 | 4/2007 | Stonesmith et al. | |
| 2007/0126157 A1 | 6/2007 | Bredt | |
| 2009/0020901 A1* | 1/2009 | Schillen et al. | 264/31 |
| 2009/0177309 A1 | 7/2009 | Kozlak | |
| 2010/0127433 A1* | 5/2010 | Medina et al. | 264/401 |
| 2010/0140852 A1 | 6/2010 | Kritchman et al. | |
| 2010/0161105 A1 | 6/2010 | Blake | |
| 2011/0101569 A1* | 5/2011 | Yasukochi | 264/401 |
| 2012/0281239 A1* | 11/2012 | White et al. | 356/601 |
| 2013/0334740 A9* | 12/2013 | Jamar et al. | 264/401 |
| 2014/0027953 A1* | 1/2014 | Costabeber | 264/401 |
| 2014/0048981 A1* | 2/2014 | Crump et al. | 264/401 |
| 2014/0191442 A1* | 7/2014 | Elsey | 264/401 |

OTHER PUBLICATIONS

Synerdyne Corporation, et al., PCT Search Report mailed Apr. 9, 2012; PCT/US2011/051835.

Synerdyne Corporation, et al., PCT Search Report mailed Apr. 9, 2012; PCT/US2011/051838.

Synerdyne Corporation, et al., PCT Search Report mailed Apr. 9, 2012; PCT/US2011/051839.

Synerdyne Corporation, International Preliminary Report on Patentability, International Appln. No. PCT/US2011/051835, mailed Mar. 28, 2013.

Synerdyne Corporation, International Preliminary Report on Patentability, International Appln. No. PCT/US2011/051838, mailed Mar. 28, 2013.

Synerdyne Corporation, International Preliminary Report on Patentability, International Appln. No. PCT/US2011/051839, mailed Mar. 28, 2013.

Non-Final Office Action in U.S. Appl. No. 12/781,312 mailed Mar. 26, 2014.

Non-Final Office Action in U.S. Appl. No. 12/885,186 mailed Mar. 20, 2014.

* cited by examiner

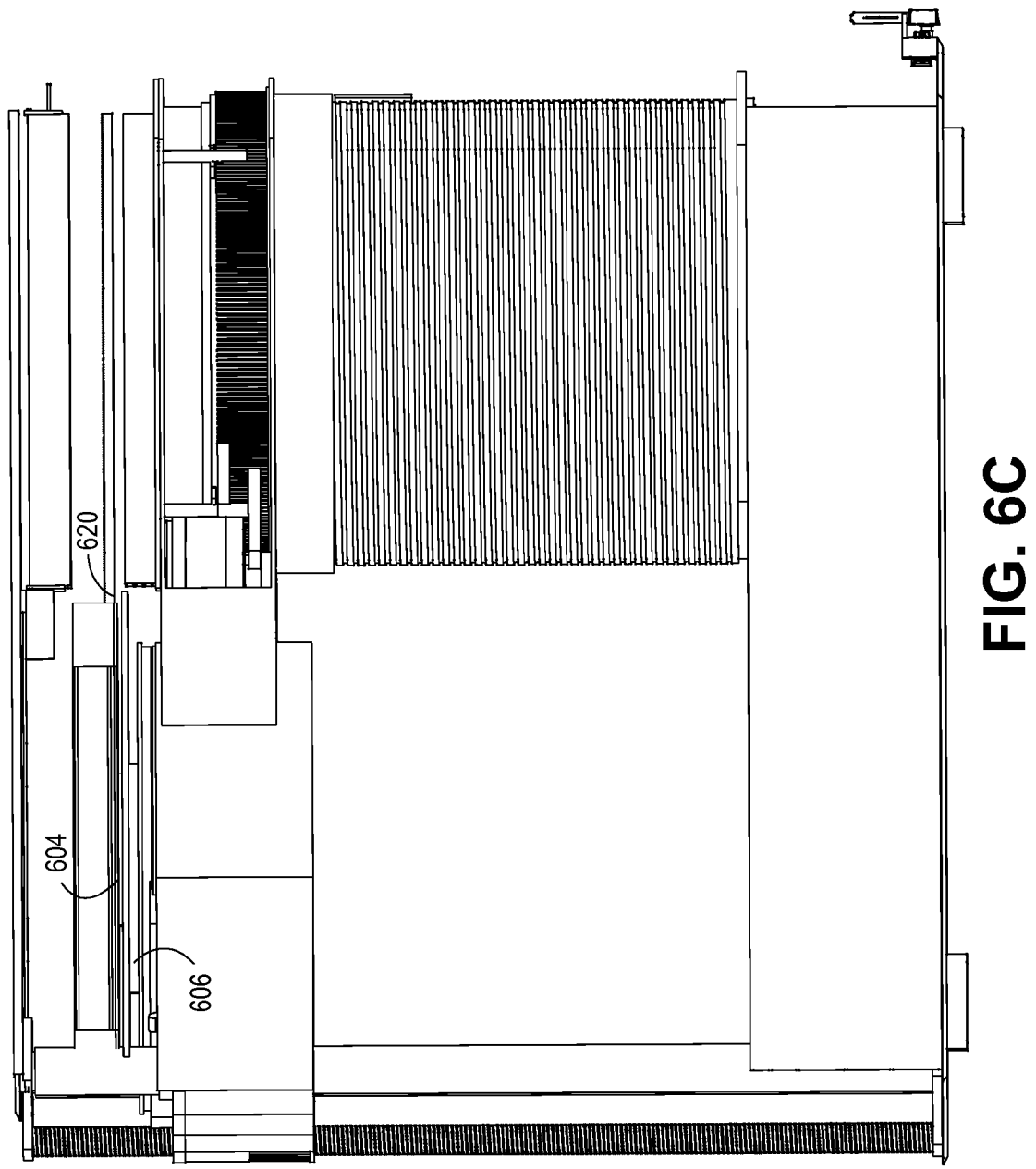

COMPACT ROTARY PLATEN 3D PRINTER

FIELD

Embodiments of the invention relate to three-dimensional object fabrication techniques. More specifically, embodiments of the invention relate to rapid fabrication of arbitrary three-dimensional objects.

BACKGROUND

The state of the art in fabrication of arbitrary three-dimensional objects is fused deposition modeling (FDM) in which tiny deposits of plastic analogous to a pixel in a three-dimensional model are deposited individually to build a desired object from the ground up. Among the problems facing FDM are speed and cost. Because each subsequent deposit fuses to the underlying previously deposited plastic, the size of the deposit and the temperature control required to effect the fusing is strictly limited. As a result, very small amounts of plastic are deposited with each deposition and if the temperature is not precisely controlled, failure along corresponding knit line is manifestly likely. Moreover, because of the small amount of each deposit, the other constraints of controlling the system during fabrication, the time required to produce even a relatively simple object is measured in hours.

Among the additional problems includes the need to insure desiccation of the plastic supply as moisture in the supply further causes the risk of failure of proper knit during fusing. Also, because of the small amount of plastic deposited any overhang cantilevered portion of the object must be supported by a sacrificial material that is laid down during the fabrication process and then dissolved away post-fabrication. The sacrificial material requirement increases the cost and time required to fabricate any particular object. Typically, both the sacrificial material and the build plastic are provided as a spool often costing hundreds of dollars for a relatively small volume of plastic. Moreover, if there is insufficient plastic remaining on the spool to complete a desired build, the spool must be removed and replaced and it is difficult to change spools mid-process or reuse a partially consumed spool. This further increases the cost associated with FDM.

A faster lower cost system with higher reliability is desirable.

BRIEF DESCRIPTION OF THE DRAWINGS

The embodiments of the invention are illustrated by way of example and not by way of limitation in the figures of the accompanying drawings in which like references indicate similar elements. It should be noted that references to "an" embodiment of the invention in this disclosure are not necessarily to the same embodiment, and they mean at least one.

FIGS. 6A-C are internal views showing the addition of a sub-element to a partially constructed object.

DETAILED DESCRIPTION

Figure 1:
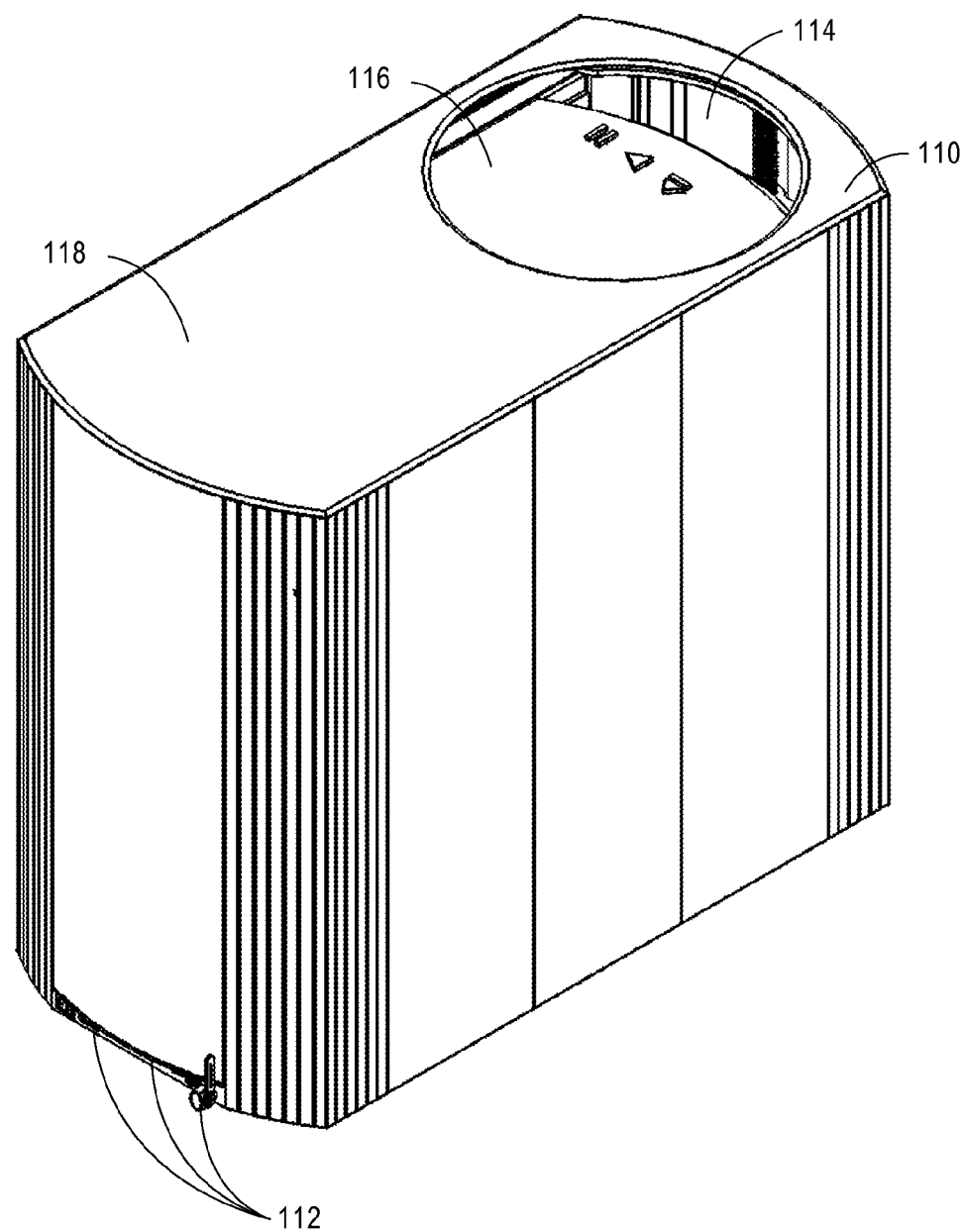
FIG. 1 is a diagram of an external view of a fabricator of one embodiment of the invention.

FIG. 1 is a diagram of an external view of a fabricator of one embodiment of the invention. Housing 110 has a portal 114 in its top surface 118. Portal 114 may be accessed through sliding door 116 to load a material supply into the fabricator and also to retrieve a fabricated object there from. In some alternate embodiments, separate portals are provided for loading the material supply and retrieving the fabricated object. In some embodiments, the portal 114 represents less than 50% of the area of the top surface. Interface unit 112 may provide USB ports, wireless antenna, an Ethernet port, or other suitable media ports that facilitate the passage into the unit of three-dimensional data representing at least a portion of the geometry of a substantially arbitrary object to be fabricated.

Figure 2:
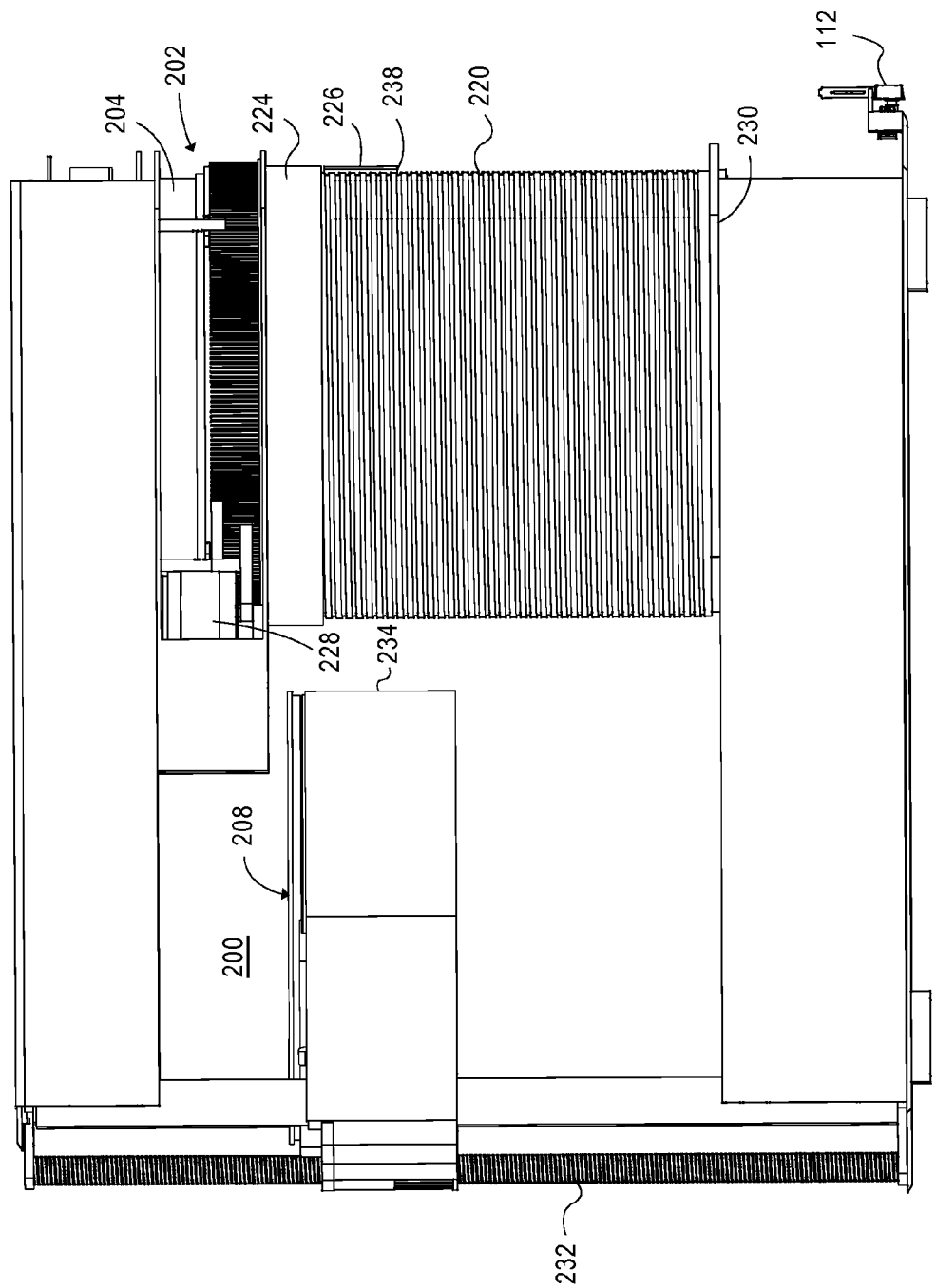
FIG. 2 is an internal view of the fabricator of one embodiment of the invention.

FIG. 2 is an internal view of the fabricator of one embodiment of the invention. Internally, there is an assembly zone 200 and a fabrication zone 202. Sub-elements of the ultimate three-dimensional object to be created are fabricated within fabrication zone 202 and then put together (assembled) in assembly zone 200. To a large degree, the maximum size of the object to be fabricated is constrained by the size of the assembly zone 200. To a lesser degree, the size of the fabrication zone affects the ultimate size of the object. In many cases, the sub-element fabricated in fabrication zone 202 will be an entire layer of the object. It should be understood that sub-elements may be a portion of a layer or other portion of the object consistent with the geometry that is the source of the build instructions. It should be further understood that to be "consistent with the geometry", the sub-element must have a size greater than a single voxel/pixel as a single voxel cannot be deemed to correspond to any distinct region with the geometry.

Within assembly zone 200 resides a build platform 234 including a turntable having a build surface 208 on which the object to be fabricated is assembled. Build surface 208 is provided with a rotational axis and a vertical axis. A driver within build platform 234 raises and lowers the build surface 208 along leadscrew shaft 232 to provide the vertical axis. An additional driver within build platform 234 rotates build surface 208 so that the object being fabricated can have any rotational orientation desired. In an alternative embodiment, the build platform may have x and y drives instead of a rotational drive, but such embodiment requires a larger assembly zone for the same size object.

When build surface 208 is driven to the top of its vertical range, it is exposed through the portal (114 of FIG. 1), which permits easy access to a fabricated object.

In one embodiment, a material supply for fabrication is a monolithic helically-threaded plastic ingot 220. The helical thread acts as part of the drive that advances the material supply, and may be consumed and eliminated as the material is used. In alternative embodiments, the thread may be replaced with gear teeth, and index step, a flange or series of flanges or the like, all features that may form part of the drive system to advance the material.

Build platform 234 is driven to its maximum height to be exposed through the portal. Any time the build platform 234 is at its maximum height, to protect the vertical axis from misalignment, one or more shear pins engage the platform so that vertical or lateral forces applied by a user are not applied to the drive servo or the vertical axis. An ingot is then loaded thereon and build platform 234 is then driven to its minimum height along shaft 232. Plastic slide 230 then engages the plastic ingot 220 from build surface 208 and transports it laterally to be accessed by the fabrication zone 202. Extrusion collar 224 is lowered over the ingot 220 and a peripheral helical ball screw drive therein engages the helical threading of the ingot 220 to allow the extrusion collar 224 to draw the ingot 220 upward. While other ways of lifting the material supply are possible such as a jack type lifter etc., the collar drive reduces the vertical space requirements over those alternatives. A bent leaf spring 226 automatically engages an index slot 228 that runs the length of the cylindrical ingot 220 to prevent the ingot 220 from turning while the collar drive is attempting to raise it. An internal drive 228 within the fabrication zone 202 then draws the ingot into the extrusion collar 224 so that it may provide source material for molder 204.

Figure 3:
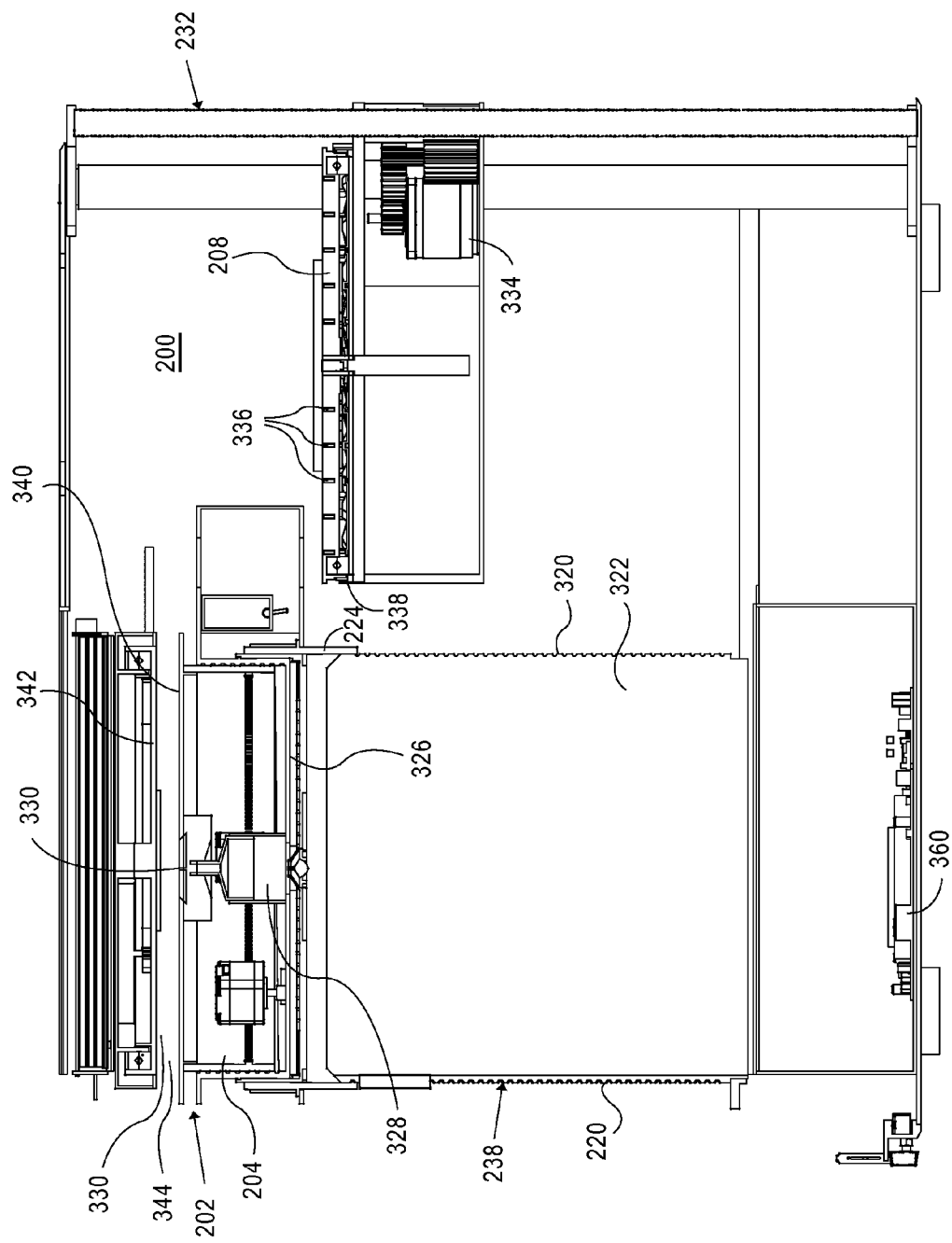
FIG. 3 is a center vertical sectional view of a fabricator of one embodiment of the invention.

FIG. 3 is a center vertical sectional view of a fabricator of one embodiment of the invention. A processor 360 receives geometry for an object to be fabricated via one or more of the interfaces (112 from FIG. 1). Processor 360 then controls the drivers to control the fabrication and assembly of sub-elements described below.

As can be seen, fabrication zone 202 includes a molder 204 having a compressor 328 that receives plastic from ingot 220. Extrusion collar 224 draws the ingot 220 up into contact with melt impeller 326, which melts and shaves the plastic and routes the resulting molten plastic via compressor 328 to an extrusion nozzle 330. Compressor 328 provides a reservoir to allow a relatively large instantaneous supply of plastic without requiring high pressure or rapid acceleration of the entire material supply. Extrusion nozzle 330 is maintained in linear relationship with the compressor and does not translate within the fabrication zone. This linear relationship and lack of translation of the nozzle and supply source allows the material supply melting to occur at lower pressure, while the smaller material reservoir in the compressor 328 can operate at high pressure and therefore draw at greater speed. However, nozzle 330 may rotate and may be narrowed or widened, as is discussed more fully below.

When the ingot 220 is mostly consumed, e.g., 90%, in one embodiment a new ingot can be added to follow on behind the mostly consumed ingot reducing or eliminating waste. The level of consumption required before addition of an additional ingot is, to some degree, dependent on the length of the extrusion collar as the consumed ingot should be sufficiently inside the collar such that the collar can engage the helical threading of the additional ingot. A sensor may be included to measure material supply usage and report the supply level via the processor. It is desirable to report not only a "supply low" condition, but also the volume of supply remaining so that a user can know if sufficient material exists to complete and intended build.

Extrusion nozzle 330 is flush with a temperature-controlled plate 340 and draws a desired sub-element on a temperature-controlled receiving plate 342. Plates 340 and 342 are retained in parallel relation. Receiving plate 342 may be slightly textured to allow improved grip by the molded plastic. The slight texture or surface pitting allows the plastic molded thereon to grip or, in other words, sustain a greater lateral force than is sustainable by plate 340. Plate 340 has a smooth surface to allow the molded, cooled layer or sub-element to glide over the surface and not stick thereto. For simplicity of discussion, we shall refer to sub-elements as "layers". However, one should understand that the discussion is equally pertinent to sub-elements generally.

By controlling the temperature of both receiving plate 342 and plate 340, efficient cooling of the molded material can be assured. In one embodiment, heat absorbed buy one or both plates in cooling the molded plastic is recycled and returned to the melt heater via a heat pump to improve the energy efficiency of the system.

The space 344 between plate 342 and 340 defines the thickness of the layer. Thus, by varying the distance between the two plates, different thickness layers of the ultimate object may be achieved. In one embodiment, receiving plate 342 is driven by a driver to control the distance between plates 340 and 342. The desirable thickness of a layer may depend on the variability of the edges of the object being fabricated. For example, where the edge is uniformly vertical over a distance a thicker layer up to that distance may be used. But where the edge is very irregular thinner layers to accommodate that irregularity or slope may be desirable. Notably, the thickness of the layer is not tied to voxel dimension. As explained below with reference to FIG. 8, minor irregularities can be addressed with an integral subtractive tool existing in some embodiments of the invention.

Additional drivers move receiving plate 342 relative to nozzle 330 to permit the arbitrary layer to be drawn. Because the aperture of nozzle 330 is variable width and can rotate, thicker or thinner walls may be drawn. In some embodiments the angular orientation or the extrusion may be controlled by for example air jets or water jets adjacent to the nozzle 330. In other embodiments the nozzle 330 may pitch to mold an angled wall. In still other embodiments, a mechanical roller or wiper may be use to profile the side walls of the layer before or after they have hardened.

As with all molders, instances will occur when the molder needs to be purged to eliminate degraded build material, etc. In one embodiment, to minimize waste and the space required for its containment, the purged material may be drawn as a disk of a desired diameter on the receiving plate 342. A waste tube having a minimally greater diameter may be provided near the fabrication zone. The receiving plate 342 may then be driven over to align the purge disk with the tube, lower the purge disk into the tube and translate away, thereby scraping the purge disk off into the tube. Subsequent purges will stack in the tube like quarters in a roll and reduce the waste storage requirements.

In one embodiment, ingot 220 formed having the helical threading also has a hydrophobic coating 320 which repels moisture but is also consumed as the ingot is melted. Beneath the hydrophilic coating is a core 322 of, for example, ABS or other suitable thermoplastic which forms the primary material of fabrication. Wax-based compounds may also be used as the thermally formable material for some applications (such as lost-wax casting mandrels). Typically the core 322 will exceed 70% by volume of the ingot and more commonly will exceed 95% by volume of the ingot 220. This provides a very high density of material supply in a single piece form factor. Such an ingot is effectively self packaged reducing waste and production costs. In some embodiments the core 322 can be formed unitarily as a whole. In other embodiments, the core 322 is formed by first molding a shell and then filling the shell with additional material.

Within the assembly zone, the driver 334 to drive the vertical and rotational components of build surface 208 is shown. Build surface 208 is part of a turntable that rotates on bearings 338 when driven by driver 334. The turntable includes a plurality of part-off rings 336 which are flush with build surface 208 during assembly. Once assembly is complete, rings 336 can be driven to elevate above surface 208 to separate the fabricated object from the build surface 208. This avoids a prior art problem that the object must be split off of a build platen by hand.

Figure 4:
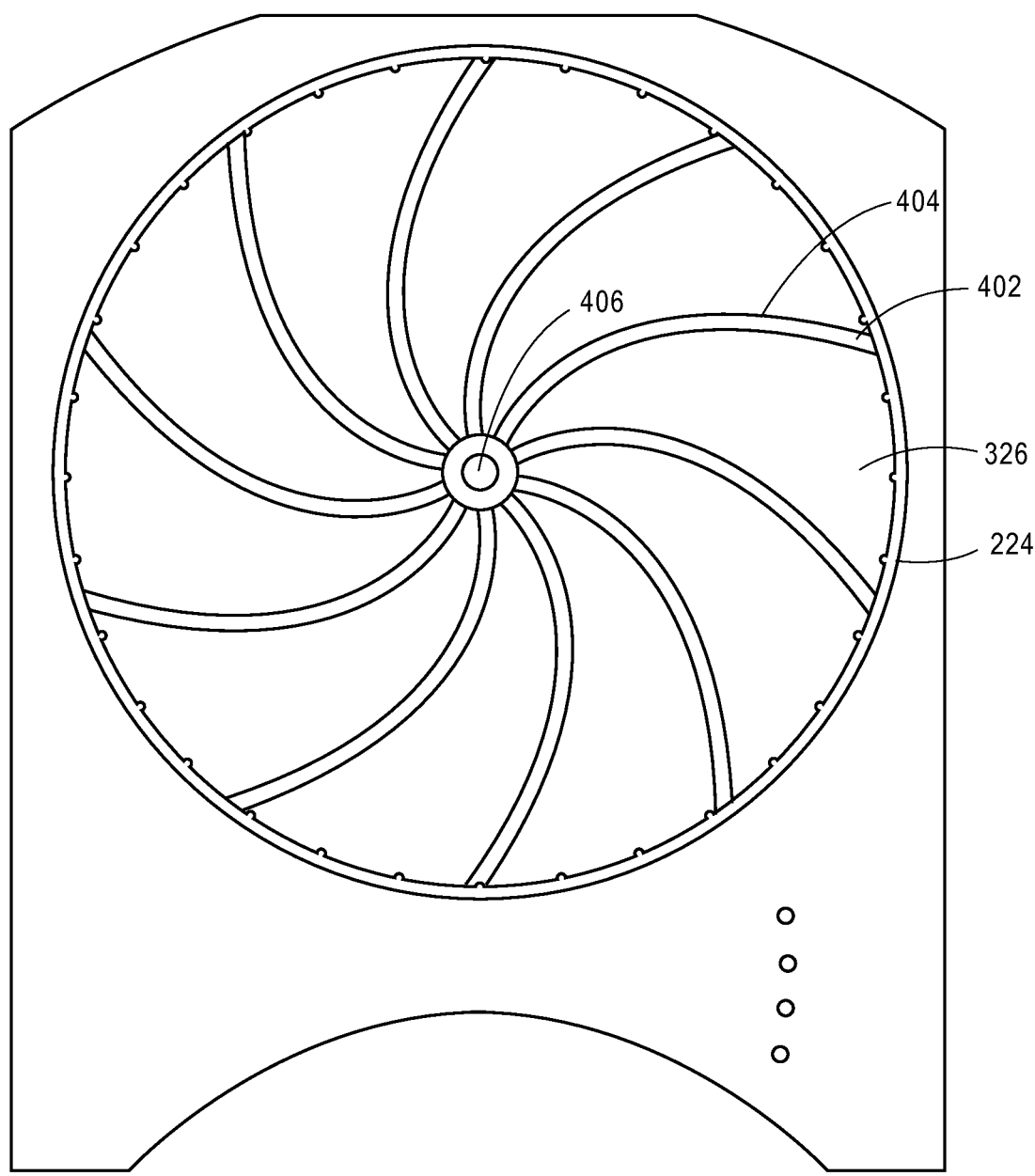
FIG. 4 is a view of the melt impeller of one embodiment of the invention.

FIG. 4 is a view of the melt impeller of one embodiment of the invention. Melt impeller 326 resides within extrusion collar 224. As extrusion collar 224 draws the plastic supply up into contact with melt impeller 326, the melt impeller is heated to melt the surface of the plastic. Additionally, melt impeller 326 rotates and the channels 402 of melt impeller 326 channel the molten plastic towards the center portal 406 and into the extrusion compressor. Melt impeller has a relatively large surface area in contact with the surface of the ingot to increase the melting efficiency. The edges 404 of the channels 402 also serve to shave off small pieces of the plastic, further facilitating melting and allowing a relatively large volume of plastic to be delivered in a short time without excessive pressure.

Figure 5:
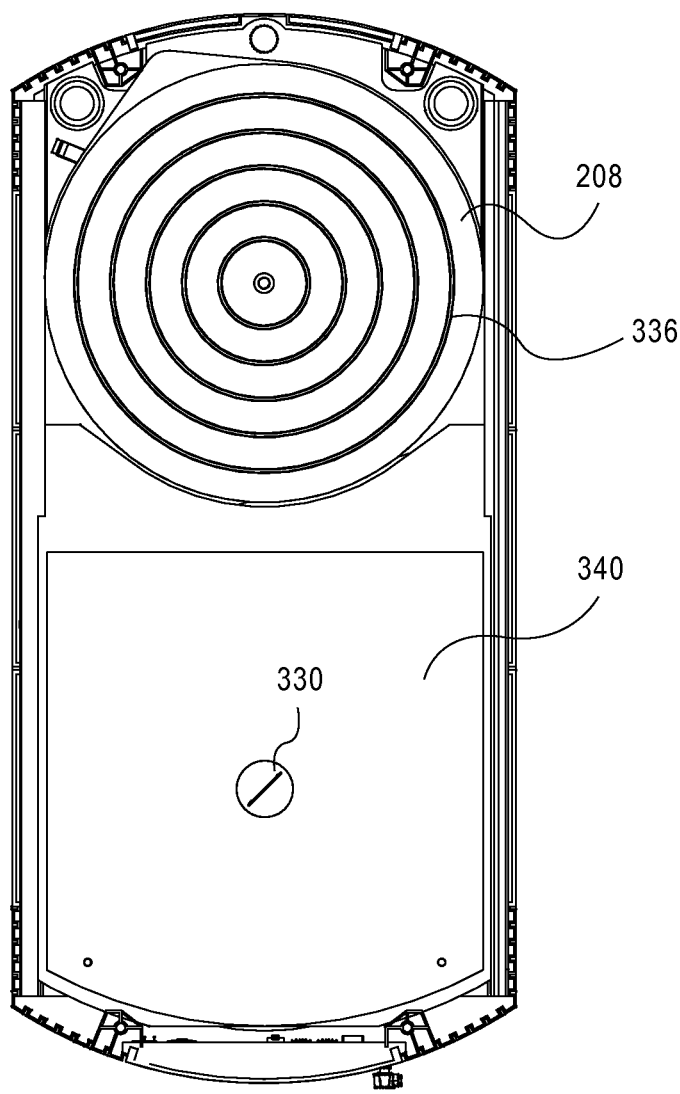
FIG. 5 is a cross-sectional view in which the build surface and extrusion nozzle can be seen.

FIG. 5 is a cross-sectional view in which the build surface and extrusion nozzle can be seen. In this view, build surface 208 and part-off rings 336 are visible. Additionally, the surface of temperature control plate 340 and extrusion nozzle 330 are shown. Extrusion nozzle 330, in this embodiment, is a slot. The length and orientation of this slot may be varied to change the profile and orientation of the molded plastic. In one embodiment, the slot with is under servo control as is the rotational orientation.

Figure 6A:
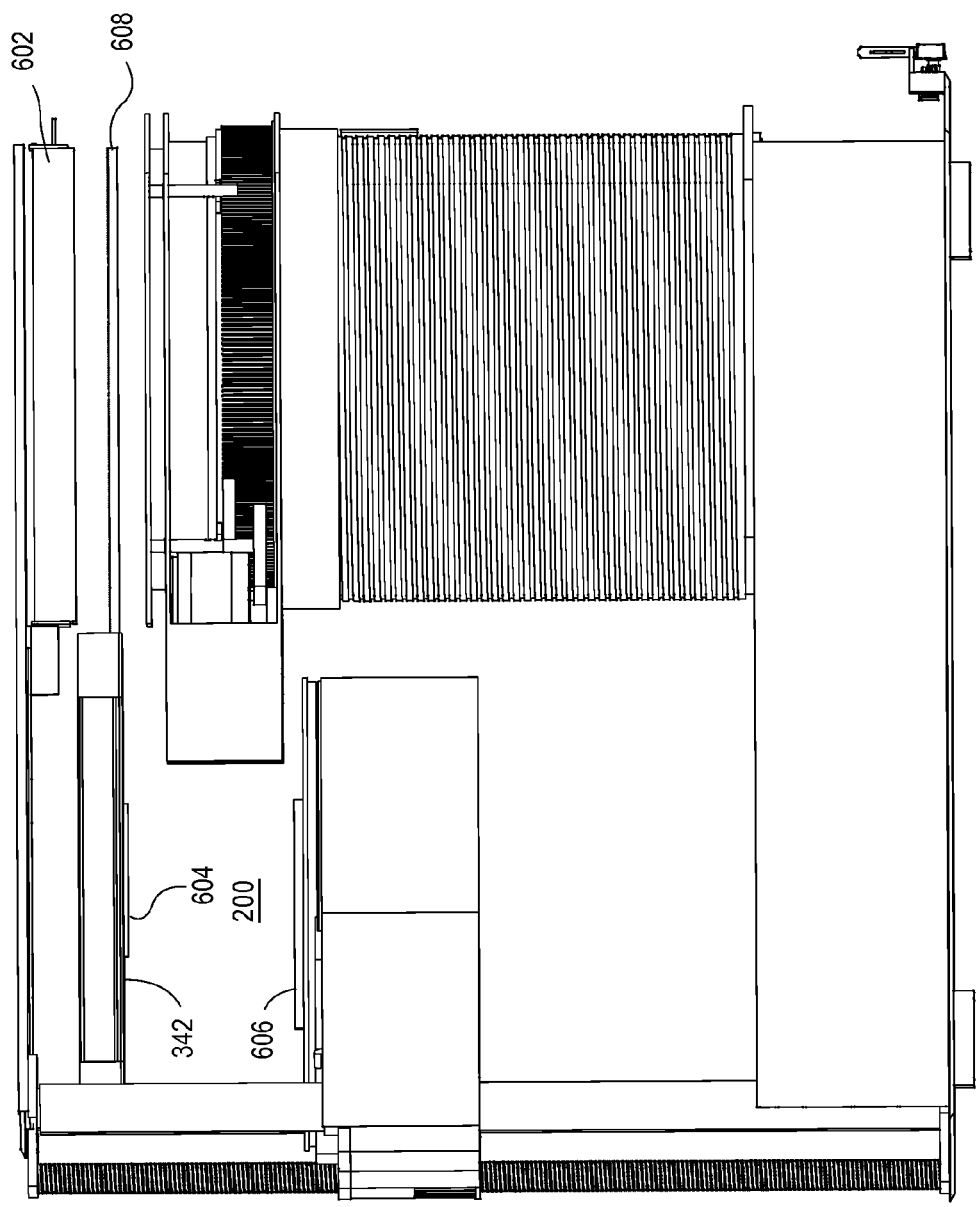
Figure 6B:
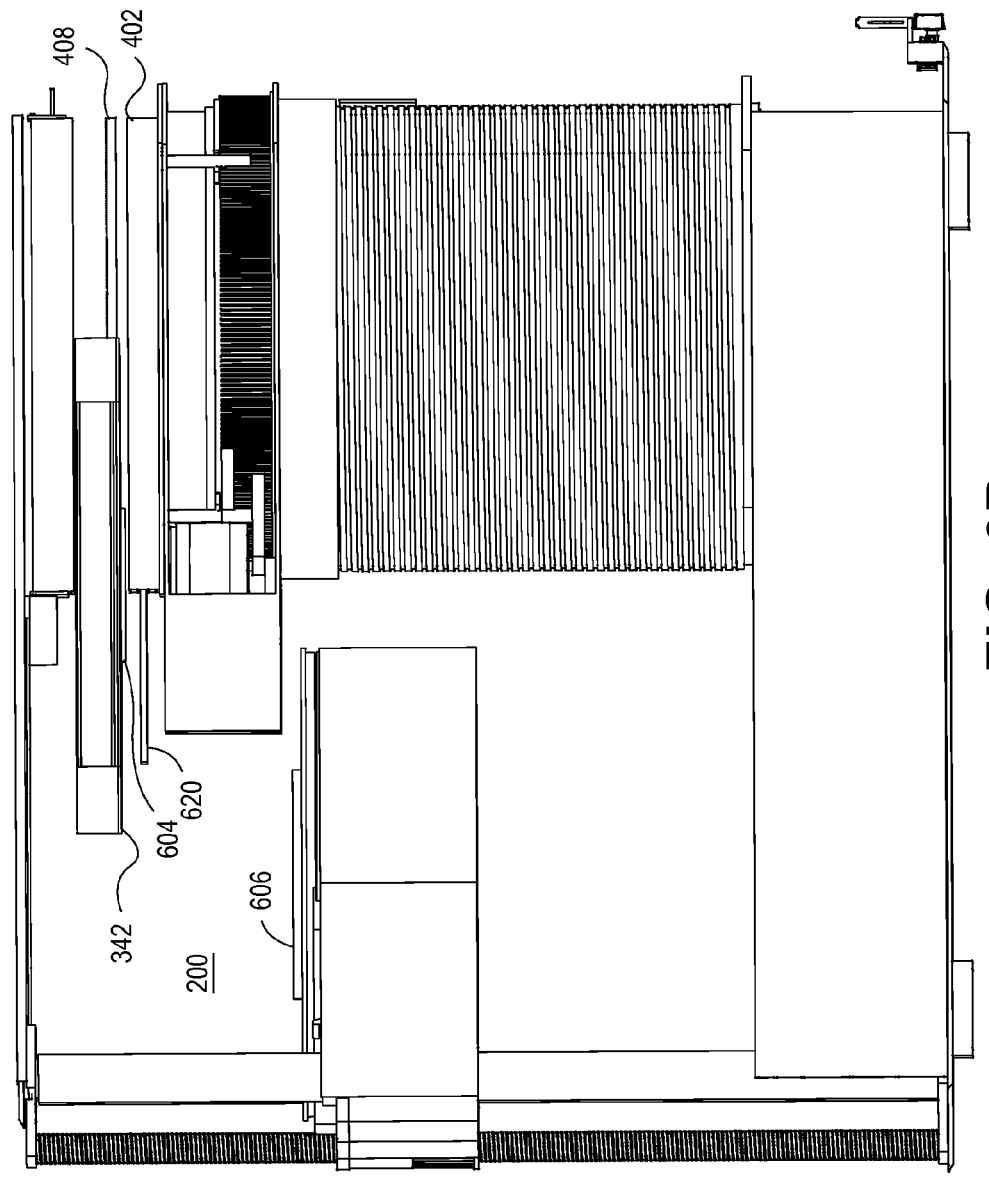

FIGS. 6A-C are internal views showing the addition of a sub-element to a partially constructed product. In FIG. 6A receiving plate 342 having layer 604 adhered thereto translates along track drive 608 into assembly area 200. This clears a path for hot box 602 to shift downward to reside within the extrusion zone below track drive 608. Hot box 602 is a thermally insulated storage box with one or more ohmic heaters therein. Hot box 602 retains welding iron 620 (shown in FIGS. 6B and 6C). Receiving plate 342 then translates back over hot box 602 along track drive 608. The partially assembled object 606 is aligned with the layer 604 by the turntable under the control of the processor as mentioned above.

As shown in FIG. 6B, receiving plate 342 then hooks or otherwise engages iron 620 and translates back into assembly zone 200 bringing iron 620 with it. Iron 620 will be maintained at a temperature to melt the surface of the plastic used in fabrication to a degree that permits adhesion between two such heated layers of plastic. To that end, a temperature sensor may be coupled thereto to ensure that the ohmic heaters in the hot box 602 are engaged when the iron 620 falls below a lower threshold temperature and disengaged when the iron 620 rises above an upper threshold temperature. The iron 620 is desirably sized to be slightly larger than the largest possible object to be assembled as this reduces the precision with which the iron must be controlled. It is also desirable that the iron 620 is selected to have a significant thermal mass as the ability to retain sufficient heat to conduct welds in fairly rapid succession reduces the wattage of the ohmic heaters required to heat the iron. Typically, iron 620 will be Teflon coated or otherwise non-stick to prevent the heated plastic from adhering thereto. It is also desirable that the material selected for the iron 620 have a high heat transfer coefficient relative to the material to be welded. A heat transfer coefficient at least twice that of the weld constituent is desirable and often it will be an order of magnitude or more higher.

FIG. 6C shows the iron pressed between two elements to be connected. Once receiving plate 328 has drawn iron 620 fully from the hot box, the layer 604 is brought together with the object 606 having the iron there between. The pressure between the layer 604 and iron 620 causes surface melting on both the object 606 and the layer 604. Typically, the entire expected contact area between the layer 604 and the expected contact surface of the object 606. The layer 604 and object 606 are then separated to release the iron 620. Preferably, the iron 620 is returned to the hot box 602 by, for example, stored mechanical force such as a spring. This results in a rapid return of the iron 620 and allows the surface molten layer 604 and object 606 to be pressed together creating a weld between them such that the resulting bond yields an object having substantially isotropic material properties. Because such a bond is relatively strong, it has no difficulty breaking adhesion between the receiving plate 328 and the layer 604. Meanwhile, the hot box 602 with the iron 620 are returned to the position above the molder as shown in FIG. 6A.

Layer 604 has now been added to the object 606 and a further layer may be molded and added subsequently. Because a layer has its own lateral strength, it is unnecessary to build a sacrificial layer to support it. Rather, the layers can be cantilevered or otherwise extend over a space below without an underlying supporting substrate. In the case of the first layer, its lower surface would be melted by the iron 620 and it would be adhered to the build surface. Once the object 606 is completed, the build platform 234 is driven to its full height to automatically expose the object 606 through the portal in the top of the unit. Again at this point the shear pins engage to protect the vertical access. Then, as mentioned above, elevation of the part-off rings 336 separates the object 606 from the build surface. The part-off rings also help to protect from unintentional misalignment of the vertical axis because they reduce lateral force that would be required if the user were to manually break the object off the build surface.

In some embodiments, once exposed through the portal, the turntable may rotate 360 degrees to provide a rotational display of the completed object.

Figure 7:
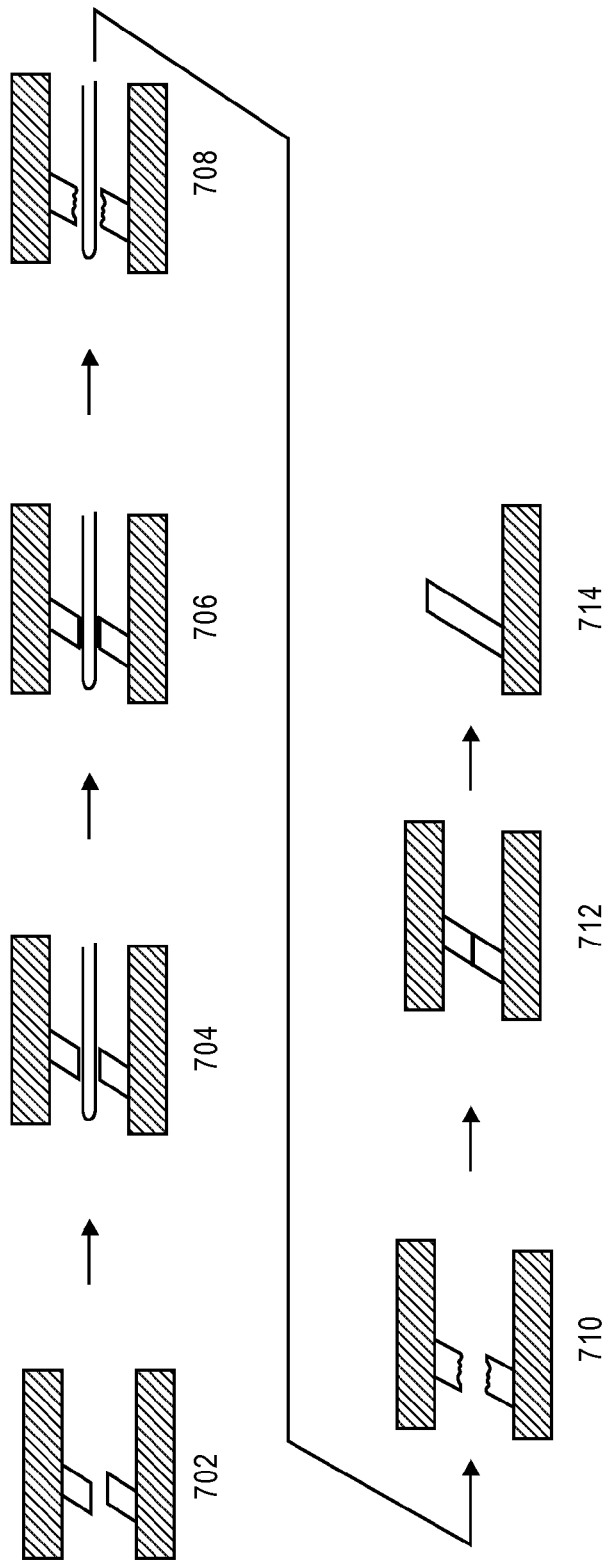
FIG. 7 is a schematic representation of the welding process of one embodiment of the invention.

FIG. 7 is a schematic representation of the welding process of one embodiment of the invention. At 702, the two elements to be welded are aligned. At 704, the iron is introduced between the two elements in aligned fashion. Alternatively, as previously disclosed, the alignment and the introduction of the iron may occur concurrently. In 706, the elements are pressed against the iron to cause surface melting of both elements. At 708, the elements are separated. At 710, the iron is removed from between the elements. At block 712, the slightly molten surfaces are pressed together and at stage 714 a new partial object including both sub-elements then exists. In other embodiments, the probe between the elements may introduce a glue or adhesive or additional molten plastic resin to cause the adhesion between the elements instead of heating the element to melt them.

Figure 8:
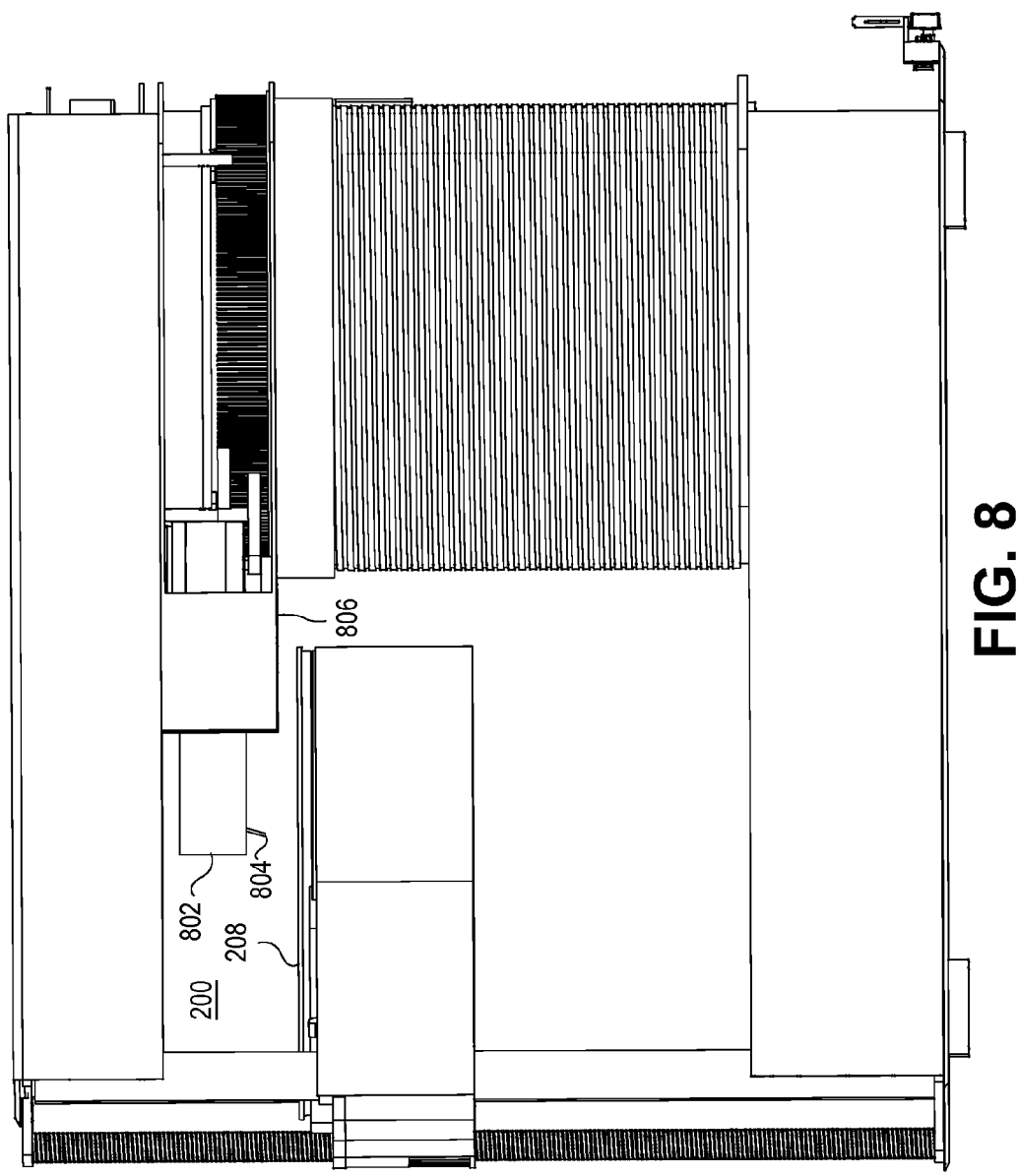
FIG. 8 is an internal view of one embodiment of the invention with a mill arm extended.

FIG. 8 is an internal view of one embodiment of the invention with a mill arm extended. A mill arm 802 is shown extended to allow it to detail a partially assembled object within the assembly zone 200. Mill arm 802 can typically be driven in arc to provide access to the entire object under assembly. Mill arm 802 also includes a drive to adjust the incidence angle of the mill head 804. Typically, provided that mill head 804 can reach the center of the turntable that provides build surface 208, mill bit 804 can be used to detail any portion of the object simply by appropriately rotating the build surface 208. In one embodiment, mill arm is provided with a suction head to collect waste particles that result from the milling. In another embodiment, an air jet is provided to clear the particles from the assembly area into a collection tray below. This avoids the risk of particles from the milling causing defects in subsequent welds.

While layers are being added within the assembly zone, typically mill arm 802 will be retracted. However, milling may be performed while extrusion is occurring within the fabrication zone. Thus, layer-by-layer access to the object can be provided to mill head 804 such that portions of the object that might be obscured when completed can be correctly detailed during the assembly of the object. The mill is driven by the motor 806 and controlled by the internal processor (not shown). In this way, minor defects in the extrusion fabrication may be corrected by subtractive detailing with mill head 804. Additionally, edge detail may be provided to permit a thicker layer to be molded than would be possible if the extrusion needed to provide all the edge detail directly. Thus, the extrusion of a layer can be used to "get close" and the mill head 804 can be use to provide added precision.

Figure 9:
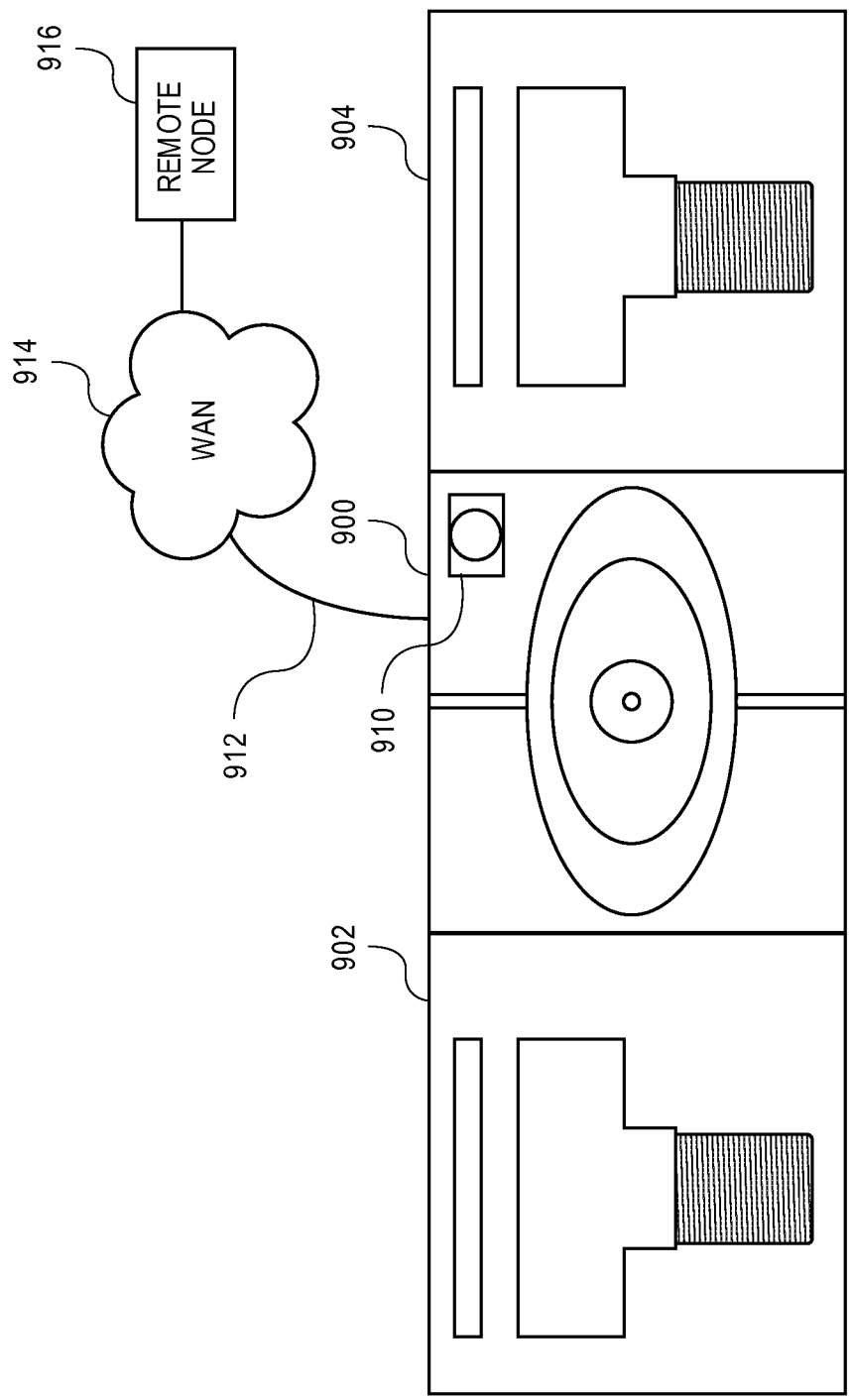
FIG. 9 is a schematic diagram of one embodiment of the invention.

FIG. 9 is a schematic diagram of one embodiment of the invention. In one embodiment, plural fabrication zones 902 and 904 are associated with one assembly zone 900. Layers or sub-elements may be manufactured and assembled in an interleaved manner to improve the speed of overall fabrication. In some embodiments, a camera 910 may exist within the assembly zone. The camera may be linked to a wide area network (WAN) 914 such as the Internet by link 912. Link 912 could be a wired or wireless link and may be direct or through a host processor. A remote node 916 may the access the camera feed in substantially real time to monitor the assembly process. Remote node 916 could be a desktop computer, a smart phone, a tablet computer, a laptop, or any suitable WAN connected device. Some embodiments may include cameras in the fabrication zone(s) to permit similar remote monitoring of the fabrication process in addition to or instead of the assembly process.

Remote node 916 may also provide an interface that permits a user to send control signals back to the fabricator to control its operation, including for example starting or stopping the process, adjustment of system calibration, etc. In one embodiment, the interface is a web page served to the remote node 916. In some embodiments, no control panel exists on the fabricator itself and all control of the operation is performed though the interface on remote node 916. It is also within the scope and contemplation of the invention to have plural assembly zones in addition to plural fabrication zones. In some embodiments, one or more layers may be assembled in a first assembly zone and then added to other layers that have been previously assembled in the second assembly zone. By increasing the parallelism of layer production and assembly, output speeds can be increased.

Figure 10:
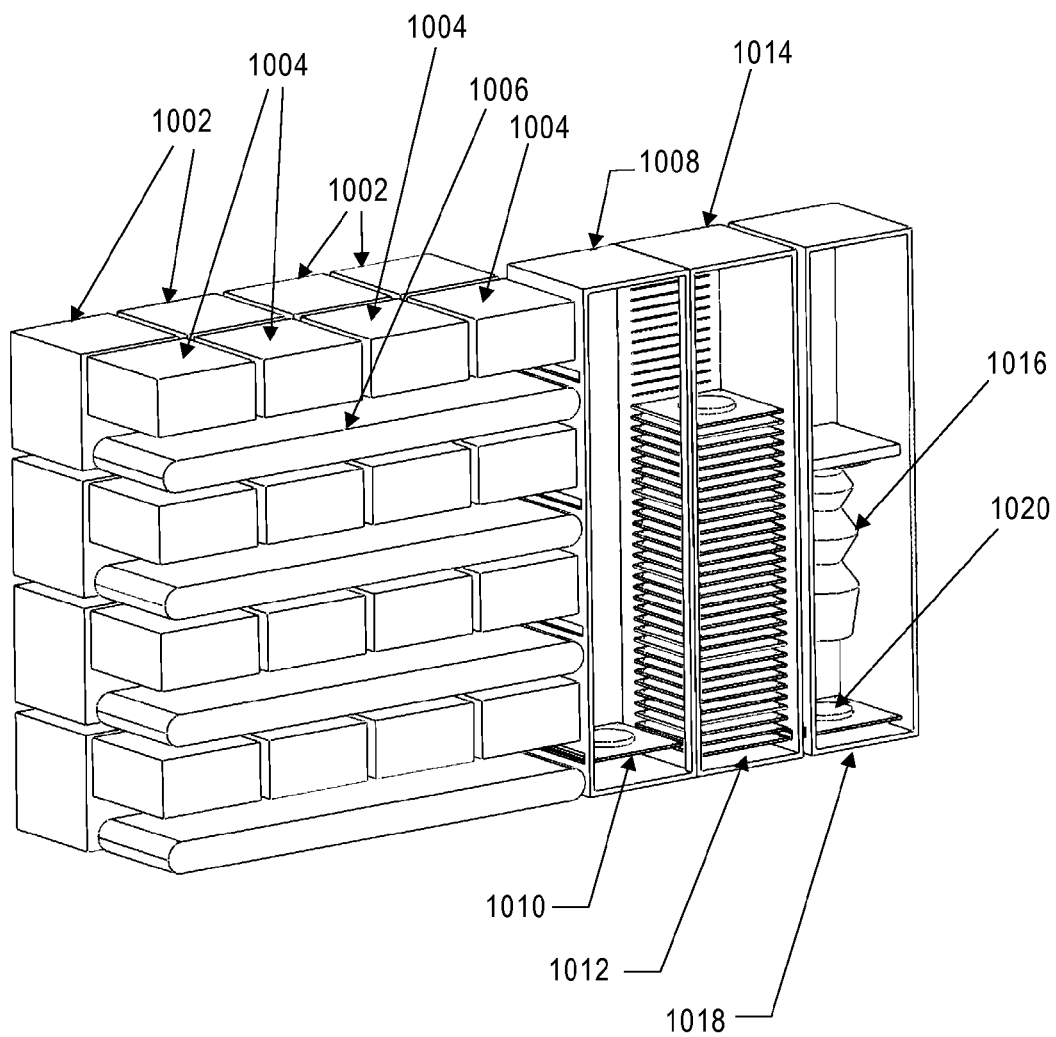
FIG. 10 is a schematic diagram of an embodiment of the invention permitting modular expansion.

FIG. 10 is a schematic diagram of an embodiment of the invention permitting modular expansion. An array of additive fabrication cells 1002, which may be each similar to the fabrication zone described with reference to FIGS. 1-5 above, may be modularly added. In other words, a user may initially constitute the system with fewer than the 4×4 array of additive cells 1002 and then expand the system as demand requires to, in this example, achieve a maximum of 16 additive cells 1002. Similarly, each additive cell 1002 may have a corresponding subtractive cell 1004, such that a layer fabricated in an additive cell 1002 is transported to the adjacent subtractive cell for detailing, for example, with a mill head, before being transported by lateral transport 1006 to elevator 1008.

Elevator 1008 raises the individual platen 1010 and places it in its intended order within the platen hopper stack 1012 residing in hopper 1014. The bottom platen in the platen stack 1012 is transported into assembly zone 1018 and aligned with build object 1016. Proper alignment of the platens can be assured by registration holes and pins that guarantee a known orientation. The weld layer 1020 is then welded within the assembly zone 1018 in a manner similar as described above in connection with FIGS. 6A-C. Specifically, a suitable hot plate heats the surface of both build object 1016 and weld layer 1020. The hot plate is then removed and the layers are pressed together. In this manner, because no post-weld detailing is required, the object can be assembled layer by layer as quickly as the welding can occur.

Once the layer is removed from its platen, the platen itself can be transported back laterally to the elevator shaft which will return it to a lateral transport 1006, which will return it to a waiting additive cell for extrusion of a subsequent layer. While in the shown embodiment a 4×4 array of additive and subtractive cells is shown, it is envisioned that other embodiments of the invention may permit either larger or smaller arrays of cells. Moreover, it is also envisioned that an additional elevator hopper and assembly zone may be added, for example, to the opposite end of the fabrication array such that two objects may be built concurrently. Notably, because the creation of layers in the additive cells, the detailing of layers in the subtractive cells and the addition of layers in the assembly zone can all occur in parallel, higher speed object creation is rendered possible.

In some embodiments, assembly zone 1018 is sufficient to accommodate the build of an object that has layers larger than any of the additive cells 1002 can draw at one time. This will generally imply that edges of layer sub-element should be welded together. However, by appropriately selecting the sub-elements of subsequent layers such that vertically pressed lamination occurs, the need for a side pressure process can be eliminated. For example, presume a cylindrical object for which an additive cell 1002 can only produce a third of the cylinder. If the three pieces forming each layer are shifted ten degrees on each subsequent layer, the weak joint between the sub-elements of any single layer does not cause systemic weakness in the finished object.

Figure 11:
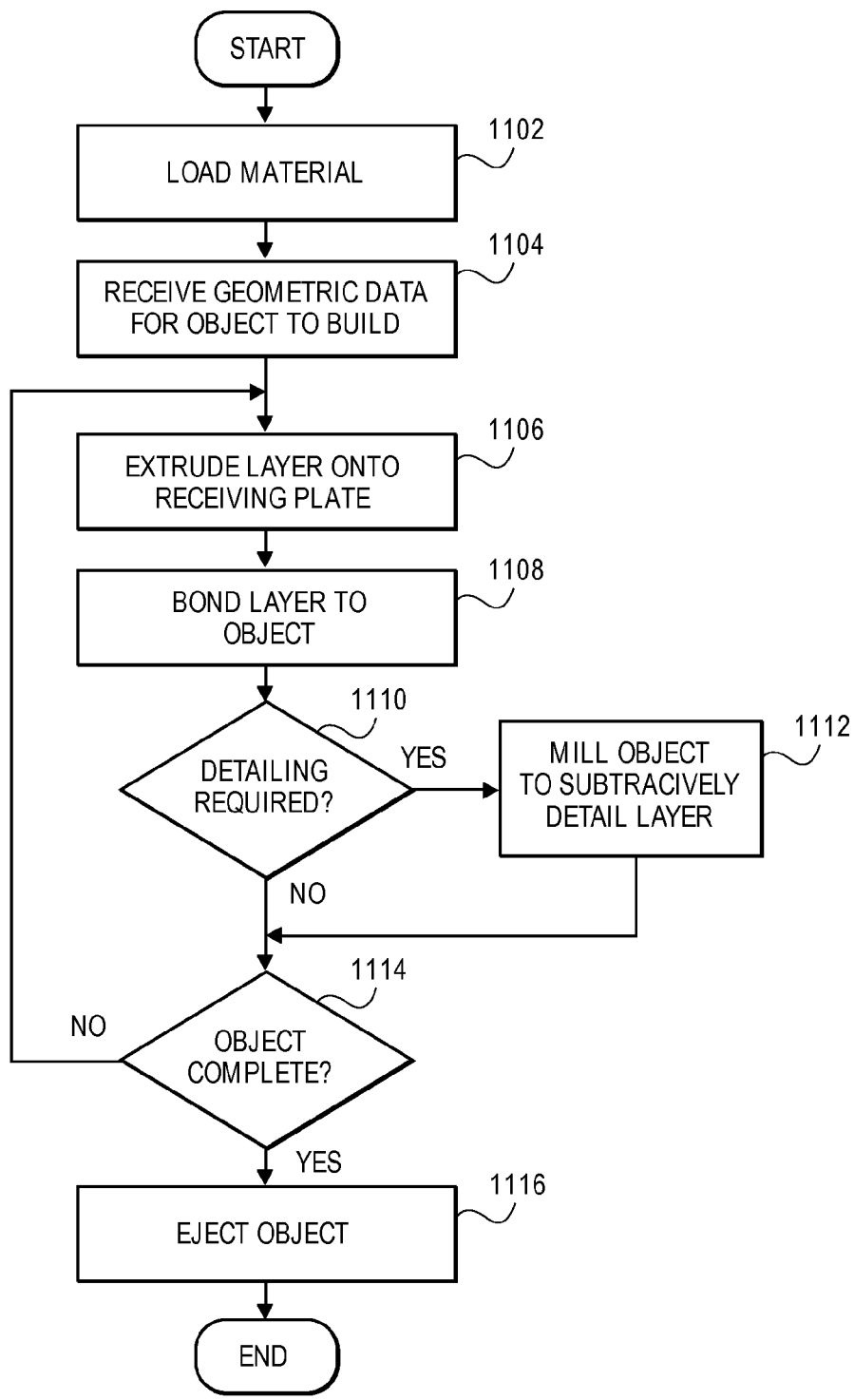
FIG. 11 is a flow diagram of operation of one embodiment of the invention.

FIG. 11 is a flow diagram of operation of one embodiment of the invention. At block 1102, material from which a three-dimensional object is to be built is loaded into a fabricator. At block 1104, geometric data corresponding to the object to be built is received in the fabricator. Geometric data may have been processed prior to loading to expressly indicate the sub-elements in order of build, or they may be processed internally within the apparatus from a simple three-dimensional model. At block 1106, a layer of the object to be built is molded onto a receiving plate in a fabrication zone of the apparatus. That layer is then transported and bonded to the object being formed at block 1108. In the case of the first layer, it is bonded to a build surface and forms the substrate for subsequent additional layers to be bonded. A determination is made at decision block 1110 whether subtractive detailing is required. If subtractive detailing is required, the object is milled to subtractively detail the layer at block 1112. The determination is made at block 1114 whether the object is complete. If the object is complete, the object is ejected from the fabricator at block 1116. Otherwise, a next layer is molded and bonded and the process continues. It should be understood that, while this is shown as a linear flowchart, many of these operation can occur in parallel. In particular, it may be possible to mill one layer while extruding another or, depending on the number of extrusion zones and the parallelism permitted, extruding and bonding may occur concurrently. These levels of parallelism are intended to be within the scope and contemplation of the invention.

While embodiments of the invention are discussed above in the context of flow diagrams reflecting a particular linear order, this is for convenience only. In some cases, various operations may be performed in a different order than shown or various operations may occur in parallel. It should also be recognized that some operations described with respect to one embodiment may be advantageously incorporated into another embodiment. Such incorporation is expressly contemplated.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

In the foregoing specification, the invention has been described with reference to the specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A three-dimensional object fabrication apparatus comprising:
   a structure defining a work area;
   an interface in the structure to receive digital data defining a geometry for a three-dimensional object to be fabricated;
   a fabrication mechanism to form a portion of the object by addition of material, substantially consistent with the digital data for a corresponding portion of the geometry;
   a rotary table mounted within the work area such that the rotary table is substantially fixed in at least one of an X or a Y axis relative to the housing, the rotary table to hold the object during fabrication; and
   an axis to traverse from a perimeter of a build area on the rotary table to at least a center of rotation to allow access to alter the shape of the object.

2. A three-dimensional object fabrication apparatus comprising:
   a housing enclosing a work area;
   an interface in the housing to receive digital data defining a geometry for a three-dimensional object to be fabricated;
   a fabrication mechanism to form a portion of the object by addition of material in layers, substantially consistent with the digital data for a corresponding portion of the geometry;
   wherein the side surface of a single layer is actively shaped substantially following the corresponding portion of the geometry.

3. The apparatus of claim 2 further comprising:
   an extrusion nozzle as part of the fabrication apparatus; and
   one of air jets or water jets adjacent to the extrusion nozzle to shape the side walls of a layer extruded by the nozzle.

4. The apparatus of claim 2 further comprising:
   a subtractive head to remove material from the side walls of a layer formed to change the side profile of the layer.

5. The apparatus of claim 2 further comprising:
   one of a wiper or a roller to change the profile of a layer while the layer remains in a semi solid state.

6. The apparatus of claim 1 wherein at least one external cross dimension of the housing is no more than 1.5 times the diameter of the rotary table.

7. The apparatus of claim 1 further comprising:
   a subtractive head wherein the subtractive head includes a drive to position the head relative to the object with at least one of a rotary platen axis, a head swing arm axis, and a head incidence angle axis.

* * * * *